UNITED STATES PATENT OFFICE.

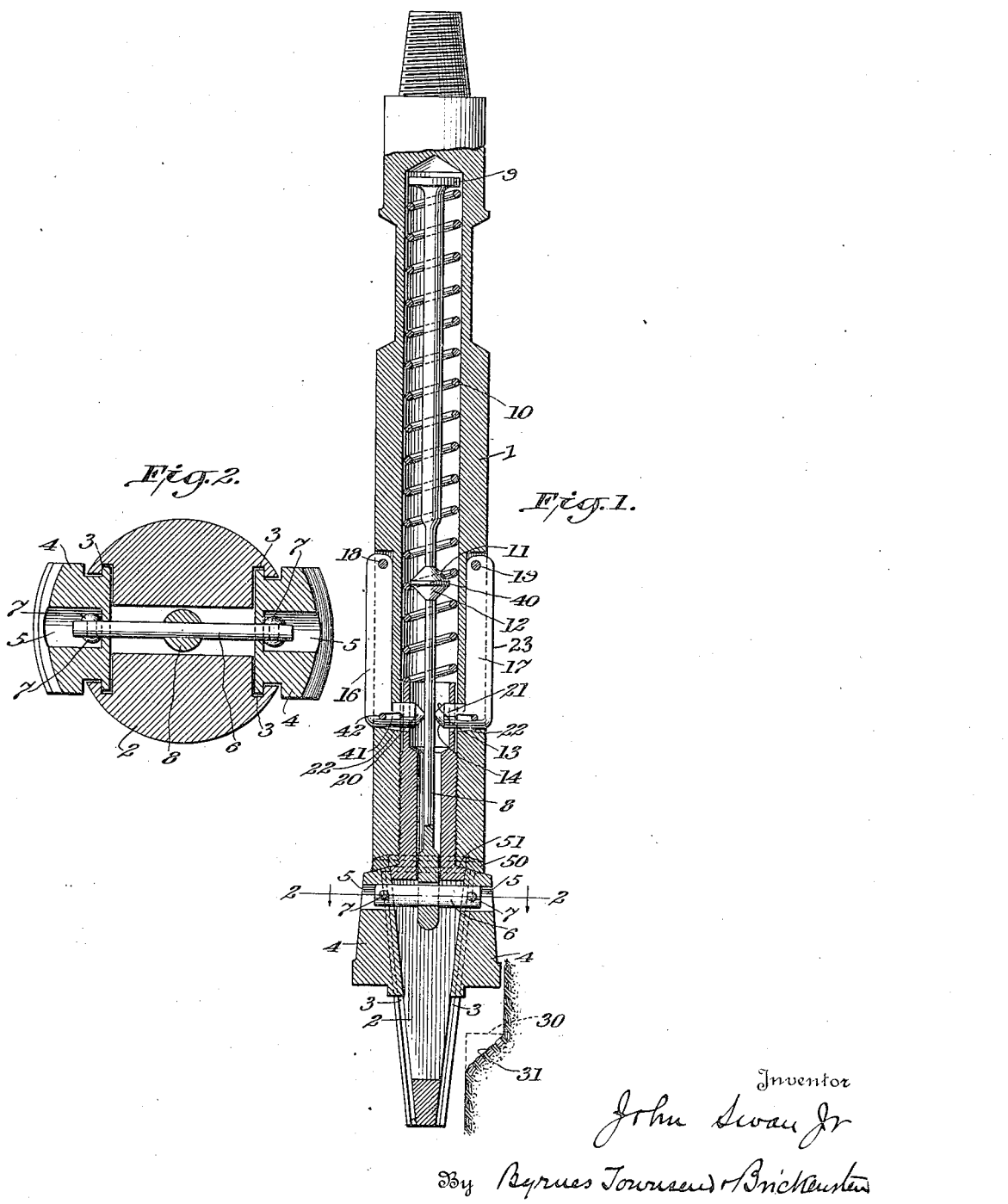

JOHN SWAN, JR., OF MARIETTA, OHIO.

UNDERREAMER.

1,422,236.	Specification of Letters Patent.	Patented July 11, 1922.

Application filed June 2, 1920. Serial No. 385,876.

*To all whom it may concern:*

Be it known that I, JOHN SWAN, Jr., a citizen of the United States, residing at Marietta, in the county of Washington and State of Ohio, have invented certain new and useful Improvements in Underreamer, of which the following is a specification.

My invention relates to an underreamer for reaming out drilled holes, and has for its object to produce a tool of this kind which shall be simple in construction, capable of resisting wear in use, and having those parts most subject to wear, capable of easy replacement.

The construction by which these and other advantages are obtained, will be understood from the accompanying specifications and drawings, in which—

Fig. 1 is a sectional elevation; and

Fig. 2 is a plan view of the part below the plane 2—2 of Fig. 1.

The underreamer comprises a hollow body portion 1 having its bottom beveled at a suitable angle. A wedge member 2 has an upward relatively long hollow extension provided externally with a screw engaging a corresponding screw thread on the interior of the body portion. As shown, this screw is cylindrical but may be made tapered if desired.

The wedge member has on opposite sides of its lower portion dovetail grooves extending from end to end, within which slide the flanges 3—3 of the cutters 4—4. These cutters have openings 5 into which extend the ends of a cross-bar 6 of generally rectangular cross-section which bar extends through suitably shaped slots in the inner walls of cutter 4—4 and through a long slot in the wedge member 2. Lugs 7—7 hold the bar in place. This cross-bar 6, also passes through a slot in the rod 8 by which the cutters are moved up and down. The rod 8 extends upwardly within the wedge member and the body, and is provided at its upper end with a head 9 between which and the upper end of the wedge member is mounted a compression spring 10. This rod is provided with a trip 40 having oppositely inclined faces 11, 12, preferably case hardened. These faces are arranged to engage the correspondingly inclined faces 13, 14, of latch members 16, 17, located within cavities in the sides of the body and pivoted at 18 and 19. These latch members have inwardly extending portions 20 and 21 which extend through openings in the body and in the wedge member extension. The upper surfaces of the portions 20, 21 bear against the upper face of the opening in the body so that when the trip rises, as will be explained later, the pressure is exercised not upon the pivots, but against these faces. The lower faces 22 of these openings are inclined and act as stops to prevent excessive outward movement of the latches. The outer faces 23 of the latches are preferably case-hardened to provide resistance wearing surfaces. The parts 20 and 21, when in the position shown serve also to prevent any relative rotation between the wedge member extension and the body. The parts 20 and 21 are provided with slots 41 through which pass pins 42 for preventing excessive inward movement of the latches.

The upper portion of this wedge member extension is bored out so that a relatively large trip 11 may be used, the latches thereby having a sufficient outward travel, as, for example, a maximum of 1-inch on each side, whereby they are capable of adapting themselves to variations in internal diameter of the casings.

At the bottom of the body I preferably provide a removable wear plate 50 of tough steel which may cover only that portion of the body with which the upper ends of the cutters contact, or it may extend, as shown in dotted lines, entirely over the end portion of the body.

In operation, the trip is set by moving the rod 8 downward, thus compressing the spring 10, bringing the trip 11 into position beneath the faces 13—14 of the latches which are held inward by the inner wall of the well casing, and causing the cutters 4—4 to move downwardly and inwardly along the dovetail grooves in the wedge. When the underreamer emerges below the lower end of the casing, the latches are released and the spring forces the rod 8 upward, thereby raising the cutters into their outward position ready for use.

In practice, it has been found, that in cutting through hard material, such as rock, the shoulder at the bottom of the hole does not remain flat, as shown at 30, but often spalls off, as roughly shown at 31. The result is that as the cutters deliver their downward blow they are driven inwardly against the wedge which is thus subject to considerable wear. Similarly the bottom of the body against which the upper surfaces of the cutters impact is subject to wear. Heretofore when the corresponding parts of underreamers became worn it was necessary to discard the inner underreamer.

My invention enables a new wedge piece or a new wear plate to be readily substituted; and this can be effected in the field without the necessity for the use of any special appliances.

The wedge piece while readily removable is securely held in place, by the long screw thread affording an adequate support while the tool is being raised and the shoulder 51 affording an abutment on the body for withstanding the shocks when the tool is at work.

My improved underreamer has relatively few parts which are of such shape as to permit cheapness of manufacture and ease of assembling, and are so disposed as to permit of easy disassembling and replacement of worn parts.

I claim:

1. In an underreamer, the combination of a body, a wedge member consisting of a wedge portion having a shoulder abutting against the bottom of the body and a hollow extension located within and removably secured to the body, cutters movably engaging the wedge portion and arranged to abut against the bottom of the body, a rod for moving said cutters and trip mechanism for controlling the movement of said rod.

2. An underreamer as claimed in claim 1 in which the trip mechanism comprises latches having longitudinally extending elements pivoted to the body and cam elements extending through the body; and also comprises a double cam co-operating member on the rod.

3. An underreamer as claimed in claim 2 in which the upper end of the wedge extension has a cavity into which extend the cam elements of the latch, said cavity being deep enough to receive the cam member on the rod beneath said cam elements.

4. An underreamer as claimed in claim 1 in which the wedge extension is screwed into the body and an element of the trip mechanism extends through the extension and the body, thereby preventing unscrewing of the wedge extension.

5. An underreamer as claimed in claim 2 having means for limiting the movement of the cam elements of the latch.

6. An underreamer as claimed in claim 1 in which a removable wear plate is provided on the bottom of the body.

In testimony whereof, I affix my signature.

JOHN SWAN, Jr.